A. TAPLIN.
FRUIT WASHING MACHINE.
APPLICATION FILED JUNE 25, 1915.
1,177,830.
Patented Apr. 4, 1916.
2 SHEETS—SHEET 1.
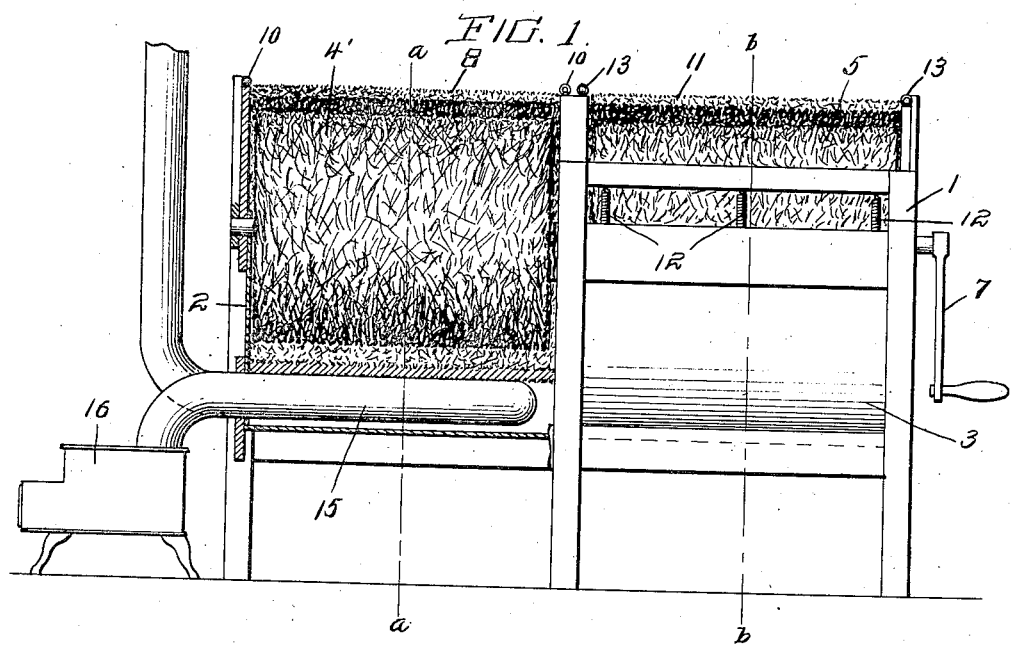
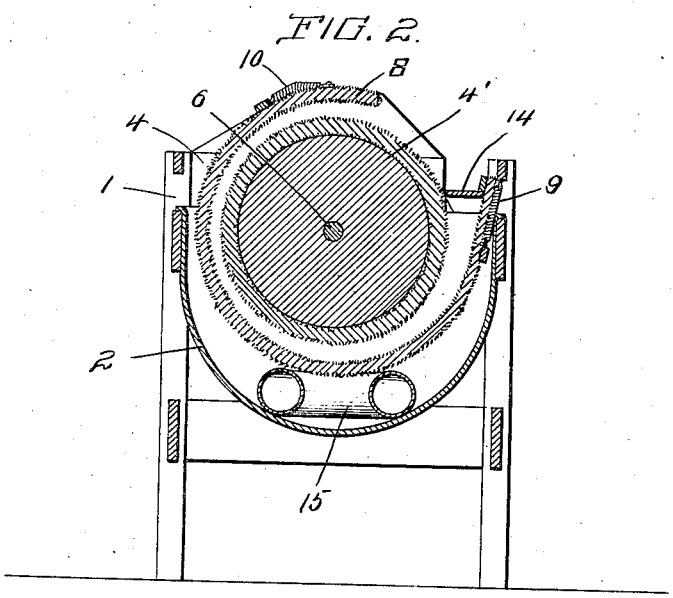
Witnesses
A. C. Newkirk
J. L. McCarthy
Inventor
A. Taplin.
By Victor J. Evans
Attorney

A. TAPLIN.
FRUIT WASHING MACHINE.
APPLICATION FILED JUNE 25, 1915.

1,177,830.

Patented Apr. 4, 1916.
2 SHEETS—SHEET 2.

Witnesses
A. C. Newkirk
J. J. McCarty

Inventor
A. Taplin.
By Victor J. Evans
Attorney

UNITED STATES PATENT OFFICE.

ALVIN TAPLIN, OF MANATEE, FLORIDA.

FRUIT-WASHING MACHINE.

1,177,830.   Specification of Letters Patent.   Patented Apr. 4, 1916.

Application filed June 25, 1915. Serial No. 36,320.

*To all whom it may concern:*

Be it known that I, ALVIN TAPLIN, a citizen of the United States, residing at Manatee, in the county of Manatee and State of Florida, have invented new and useful Improvements in Fruit-Washing Machines, of which the following is a specification.

This invention relates to improvements in fruit washing machines, especially fruit washing machines of the type described and claimed in the Letters Patent of the United States No. 772,441 granted to me October 18, 1904 and in which a revolving brushing cylinder and a yieldable surrounding brushing element are arranged in a tank, the object of the present invention being to effect improvements in the construction of the machine by providing the same with a plurality of tanks and brushing devices and means for warming the water in one of the tanks so that the fruit is washed in warm water and while warm after treatment in the warm water tank is further brushed in another tank and dried, the heat of the fruit being utilized in the drying process and hence enabling the complete operation of washing and drying the fruit to be performed by the improved washing machine and enabling other drying means to be dispensed with.

The invention consists in the construction, combination and arrangement of devices hereinafter described and claimed.

Figure 3:
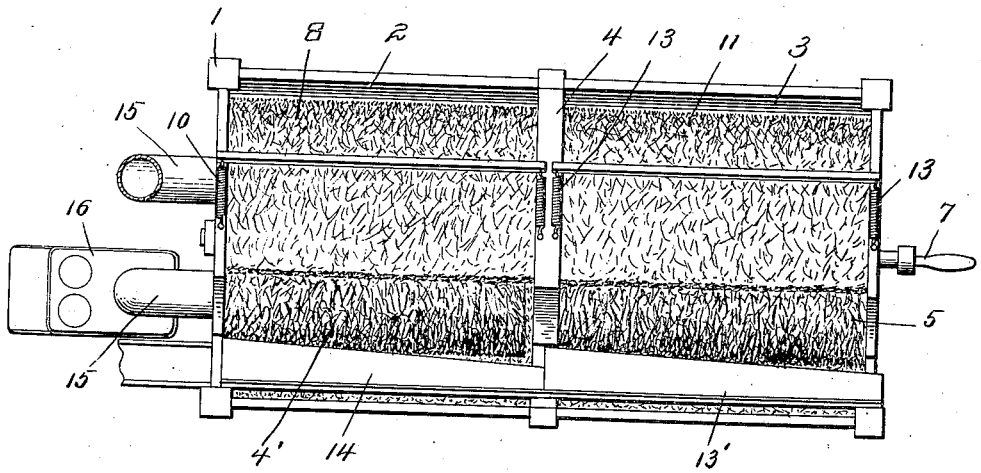
Figure 4:
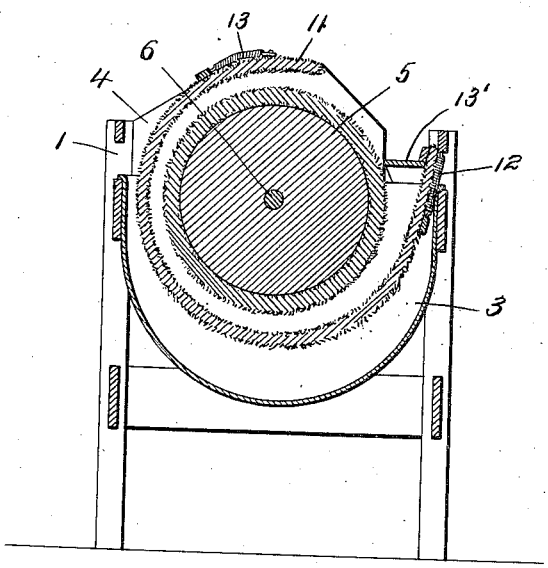

In the accompanying drawings: Figure 1 is partly a side elevation and partly a vertical longitudinal sectional view of a fruit washing machine constructed in accordance with my invention. Fig. 2 is a vertical transverse sectional view of the same on the plane indicated by the line *a—a* of Fig. 1 and intersecting the washing compartment or tank. Fig. 3 is a plan of the same. Fig. 4 is a vertical transverse sectional view of the same on the plane indicated by the line *b—b* of Fig. 1 and intersecting the drying and brushing compartment or tank of the machine.

In the embodiment of my invention I provide a suitable frame 1 which has two compartments or tanks 2, 3 arranged end to end and separated by a partition wall 4. These compartments or tanks are here shown as substantially semicylindrical in cross section. Brushing cylinders 4', 5 are respectively arranged in the tanks 2, 3 and are provided with a common shaft 6 which may be rotated manually or by power as desired and which for the purposes of this specification is here shown as provided with a crank 7 to enable the shaft and cylinders to be rotated manually. Each of these cylinders has a peripheral brushing surface which may be such as is described in the Letters-Patent hereinbefore referred to.

In the cylinder in the tank in the compartment 2 and in association with and arranged to nearly surround the cylinder 4' is a flexible brushing element 8 which is spaced from said cylinder as shown and which is supported at the outer side or end by springs 9 and which has that portion that is arranged above said cylinder yieldingly supported by springs 10. A similar flexible surrounding brushing element 11 is associated with the cylinder 5 in the tank or compartment 3, its supporting springs being indicated at 12, 13. These flexible surrounding brushing elements may be of the construction described in the said Letters Patent or of any other suitable construction. The primary or washing tank 2 is provided at its outer corner, on its front side with a suitable feed trough 15 to feed oranges or other like fruit to said tank or compartment and between the cylinder 4' and the flexible surrounding brushing element 8 so that the rotation of the cylinder in the direction indicated by the arrow will cause the fruit to be taken down into and through the water in said tank, revolved and brushed between the opposing surfaces of said cylinder and surrounding yieldable brushing element, so that the fruit will be thoroughly washed and brushed and then discharged from between the upper side of said cylinder, and the upper discharge end of the said flexible brushing element onto a discharging inclined trough or like element 14 which conveys the fruit just washed and brushed to the tank or compartment 3.

Heretofore in the operation of fruit washing machines of this class cold water has been used for washing the fruit and it has been necessary for those washing and brushing the fruit to dry the fruit before packing, and this drying process has necessarily required the employment of more or less expensive apparatus. In accordance with my invention I provide for washing the fruit in hot water and hence I provide the compartment or tank 2 with a heating coil 15 which is submerged therein and which can be heated by hot air, steam, hot water, or any other suitable heating medium. In a fruit washing machine of simple construction and type and which may be sold for a moderate price I find that an ordinary stove such as shown at 16 in Fig. 1 can be employed for heating the water in the tank 2 by including the heating coil in and as a part of the smoke escape pipe of the stove, and as shown, any suitable means may be employed for heating the water in the tank 2, within the scope of my invention.

After the fruit has been washed in the hot water of the tank 2 and brushed by the cylinder and surrounding flexible brushing element of said tank the fruit while still wet and heated as the result of its immersion in the hot water of the tank 2 is discharged by the incline 14 into the tank 3 and fed between the cylinder 5 and brushing element 11 of said tank 3 said cylinder and brushing element rubbing the fruit dry and the drying of the fruit being greatly promoted by reason of its heated condition, so that the fruit discharged from the tank or compartment 3, by the discharged incline or trough 13 thereof is dry and is in condition to be packed for shipment without further treatment.

Having thus described my invention, I claim:—

1. In a fruit washing machine of the class described, a primary tank, a secondary tank, revolving fruit brushing mechanism in each of said tanks, means for heating water in the primary tank, means for discharging heated washed and brushed fruit from the primary tank and feeding such fruit to the brushing mechanism in the secondary tank, and means to finally discharge the fruit from the secondary tank.

2. In a fruit washing machine of the class described, a primary tank, a secondary tank, revolving fruit brushing mechanism in each of said tanks, common revolving means for the brushing mechanisms, means to heat water in the primary tank, means to discharge heated washed and brushed fruit from the primary tank and to feed such fruit to the brushing mechanism in the secondary tank, and means to finally discharge the fruit from the secondary tank.

In testimony whereof I affix my signature in presence of two witnesses.

ALVIN TAPLIN.

Witnesses:
J. S. TARRER,
CHAS. B. O'NEAL.